United States Patent [19]

Ono

[11] Patent Number: 5,920,706
[45] Date of Patent: Jul. 6, 1999

[54] PERSONAL COMPUTER CARD WITH A DETACHABLE DISPLAY SECTION

[75] Inventor: Hiroshi Ono, Tokyo, Japan

[73] Assignee: NEC Corporation, Japan

[21] Appl. No.: 08/713,133

[22] Filed: Sep. 16, 1996

[30] Foreign Application Priority Data

Sep. 25, 1995 [JP] Japan ................................. 7-246252

[51] Int. Cl.6 .................................................. G06F 13/00
[52] U.S. Cl. .......................... 395/286; 395/280; 395/891
[58] Field of Search ................................. 395/282, 286, 395/280, 281, 882, 891, 892, 893, 894, 309

[56] References Cited

U.S. PATENT DOCUMENTS

| 5,613,095 | 3/1997 | Moss et al. | 395/500 |
| 5,619,396 | 4/1997 | Gee et al. | 361/686 |
| 5,619,515 | 4/1997 | Hayama | 371/48 |
| 5,625,372 | 4/1997 | Hildebrand et al. | 345/8 |
| 5,650,955 | 7/1997 | Puar et al. | 365/51 |
| 5,684,497 | 11/1997 | Hildebrand et al. | 345/8 |

FOREIGN PATENT DOCUMENTS

| 658851 | 6/1995 | European Pat. Off. . |
| 1-139581 | 9/1989 | Japan . |
| 2298942 | 9/1996 | United Kingdom . |

Primary Examiner—Ayaz R. Sheikh
Assistant Examiner—Xaun M. Thai
Attorney, Agent, or Firm—Ostrolenk, Faber, Gerb & Soffen, LLP

[57] ABSTRACT

A card for insertion into a personal computer including a body block and display block. A reception section in the body block receives data from the personal computer. The data is converted by a parallel to serial data converter and optically transmitted to the display block through an optical transmission circuit and an LED. In the display block, the optically transmitted data is received through a photo detector and an optical reception circuit. The received data is converted by a serial to parallel converter and displayed on an LCD through a display unit control section and a control signal generation circuit.

10 Claims, 13 Drawing Sheets

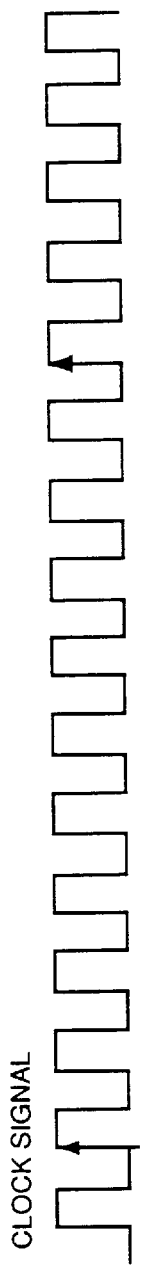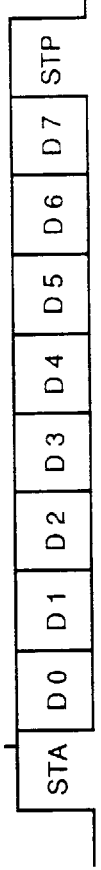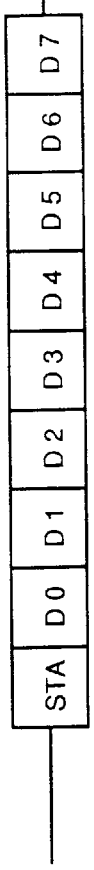
FIG.6A   FIG.6B   FIG.6C   FIG.6D   FIG.6E

PERSONAL COMPUTER CARD WITH A DETACHABLE DISPLAY SECTION

BACKGROUND OF THE INVENTION

This invention relates to a separative personal computer (referred to as PC, hereinafter) that is used for an external storage unit of a PC and the like, and of which a display unit and data processing block can be connected/disconnected that is used.

FIG. 12 is a block diagram showing a conventional embodiment of a PC card construction with a display unit, and FIG. 13 is a perspective view showing a schematic structure of the PC card with a display unit.

In FIG. 12 and FIG. 13, the PC card with a display unit is of PCMCIA specifications, of which thickness is 3.3 mm or 5 mm, at the most 10 mm. And the PC card comprises a connector 1 equipped with a contact pin with PCMCIA specifications, a PC connection control section (PCMCIA controller) 2 for controlling data transmission/reception (connection) with a PC (not shown in the figure), a memory 3 for performing data transmission/reception with the PC, and a CPU 4 for controlling each section of the PC card with a display unit.

The PC card also comprises a switching detection section 5 for detecting various instruction operations and the like, a switch 6 for performing various instruction operations, a power source 7 using a chargeable battery for supplying direct current to each section of the PC card with a display unit, a liquid-crystal display (referred to as LCD, hereinafter) 8 for displaying processing data on its screen, and a display unit control section 9 for controlling screen display for the LCD 8.

Next operations of the conventional embodiment are explained.

In FIG. 12 and FIG. 13, in use of the PC card with a display unit, the connector 1 is connected to the connection section (slot) of the PC. When a setting operation by the switch 6 is input to the CPU 4, the CPU 4 performs control operation based on the instruction. For example, the PC connection control section 2 and the memory 3 control a data transmission instruction and the like, and the data is transmitted to the PC connected to the connector 1 via the connector 1. At the same time, the data is displayed on the screen of the LCD 8 by the data display unit control section 9 based on the operation of the switch 6.

In addition, the CPU 4 controls to ingest data from the connected PC through the connector 1 and the PC connection control section 2. A PC card with a display unit operating in this way may be equipped in a radio selective calling unit, a radio portable phone and a portable information terminal and the like. In these cases the PC card may be used without being connected to the PC. For this purpose, the LCD 8 is provided for various screen displays.

The PC card with a display unit has a thickness of 3.3 mm, 5 mm or 10 mm when the PC card meets PCMCIA specifications. The connector 1 is provided to be connected to the PC connection section corresponding to the thickness. Extension sections such as the switch 6 and the LCD 8 project from the PC connection section so as to facilitate screen viewing and operations. One of the conventional embodiments of a PC card with a display unit like this is disclosed in JP-U-No.139581/1989 "IC card with display function". In the embodiment of JP-U-No.139581/1989, each part of a divided a plurality of display section comprises a liquid-crystal display element of a glass substrate. In this way the thickness of the PC card with PCMCIA specifications is regulated so as to be connected to the connection section of the PC, therefore a display unit and an operation section required for a portable unit cannot be set in the card. In other words the display unit and the operation section are set as an extension part and consequently the dimension becomes large and the card is difficult to be shaped to a portable form.

A radio section and a display section are not built in a PC card with a display unit in the above-mentioned conventional embodiment but are set on the outside of the PC connection section (slot). Therefore a signal line from the display section passes through the radio section and, for example, a display processing clock signal is mixed into a processing signal of the radio section. As a result a data error is generated. When the IC card with a display function in the above-mentioned embodiment is used in the same way, the same trouble is caused.

SUMMARY OF THE INVENTION

It is an object of the present invention to solve the above-mentioned problem.

It is another object of the present invention to make a display unit and a data processing unit connectable/disconnectable so that portability and operativity is improved. The wiring of a signal line's passing through the mounted radio section and display section and the like will be reduced by using optical transmission and the like to prevent a display processing clock signal and the like from mixing into a radio section processing signal and the like, and a separative PC card for secure data processing will be provided.

The object of the present invention is achieved by a PC card to be connected with a computer comprising a body block and a display block, wherein the body block comprises: a connector for connecting with the computer; connection control means for controlling connection between the connector and the computer; first data conversion means for receiving data from the computer via the connector and converting the data into a specified format data; and transmission means for transmitting the data converted by the data conversion means to the display block not through wire; and the display block comprises: reception means for receiving data transmitted from the transmission means of the body block; second data conversion means for converting data received by the reception means into a specified format data; and display means for displaying data converted by the second data conversion means.

In the present invention data is transmitted between the body block and the display block connectable/disconnectable to/from the body block by, for example, optical transmission instead of wire and the data received by the display block is displayed on the screen. At this time this operation instruction is optically transmitted/received from the body block or the display block, therefore the body block and the display block become connectable/disconnectable when the transmitted data is displayed on the screen. As a result portability and operativity are improved.

Moreover the display block can be used separately from the body block. Therefore the increase of the dimension can be more reduced when compared with the case where the display block and the body block are integrated and consequently the PC card can be shaped in a portable form.

The body block optically transmits data to the display block, therefore a clock signal and the like is no longer required in this processing. For example, when the PC card is equipped in a radio selective calling unit, a radio portable phone or a portable information terminal and the like, no clock signal mixes into a radio processing signal and consequently a data error is rarely generated.

Moreover a data processing block connectable/disconnectable to/from the body block is provided for optical bilateral data transmission between the body block and the data processing block. As described above, when the body block and the display block become connectable/disconnectable in bilateral data transmission, portability and operativity are improved and the clock signal no longer mixes into a radio processing signal when a radio section is mounted.

Furthermore, a computer is connected to the data processing block for data transmission with the computer connected to the data processing block. As a result portability and operativity are improved and the clock signal no longer mixes into a radio processing signal when a radio section is mounted. At the same time the connected computer transmits data therefore the data can be transmitted in large capacity.

Moreover if the current optical transmission destination is automatically determined from the body block or the data processing block, a user is allowed secure and easy data transmission at any time.

BRIEF DESCRIPTION OF THE DRAWINGS

This and other objects, features and advantages of the present invention will become more apparent upon a reading of the following detailed description and drawings, in which:

FIG. 6A to FIG. 6E are timing charts showing a second embodiment of processing signals and timing of operations;

DESCRIPTION OF THE EMBODIMENTS

The separative PC card of the present invention is explained in detail, referring to the figures.

Figure 1:
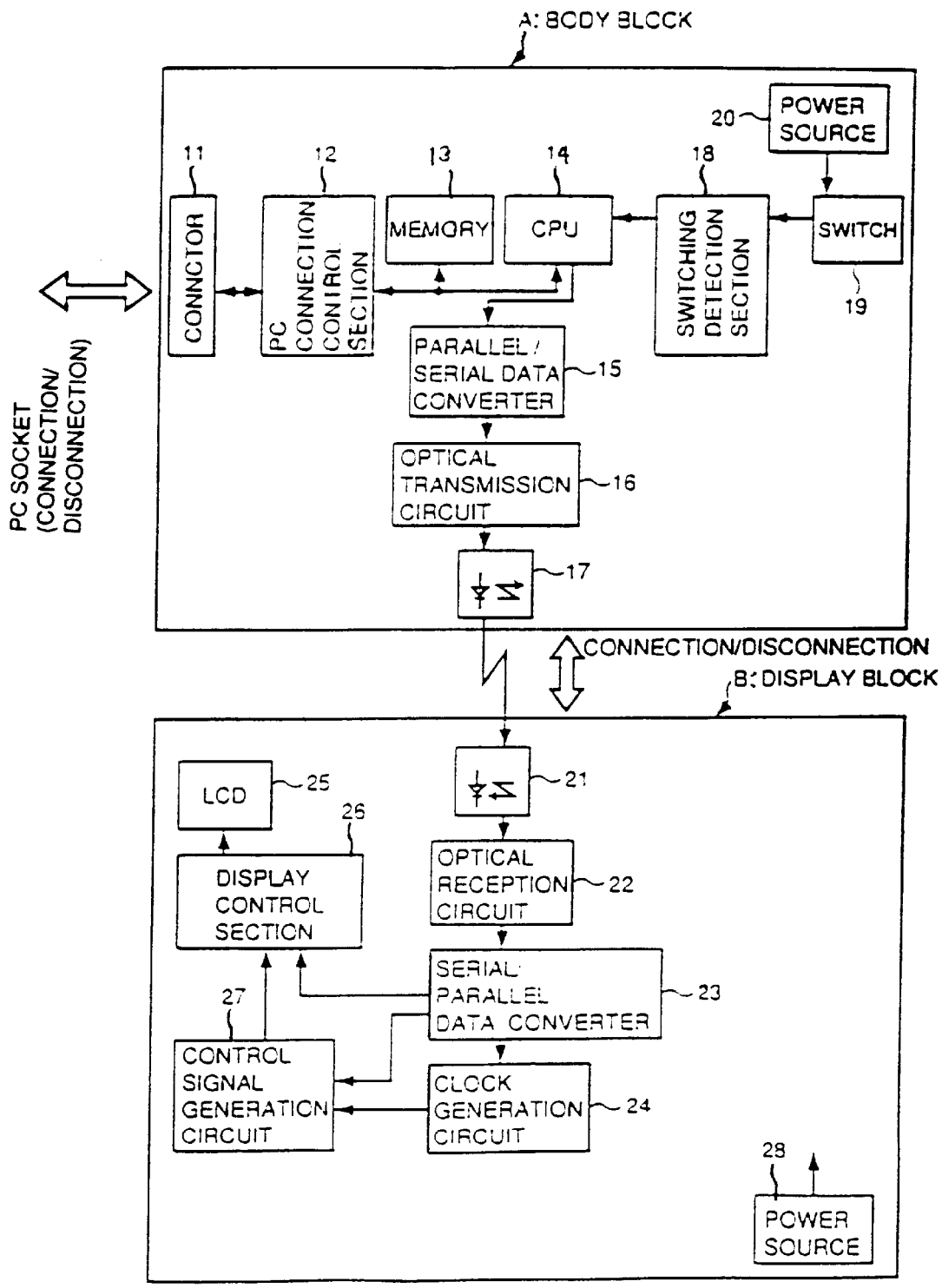
FIG. 1 is a block diagram showing a first embodiment of a structure.
Figure 2:
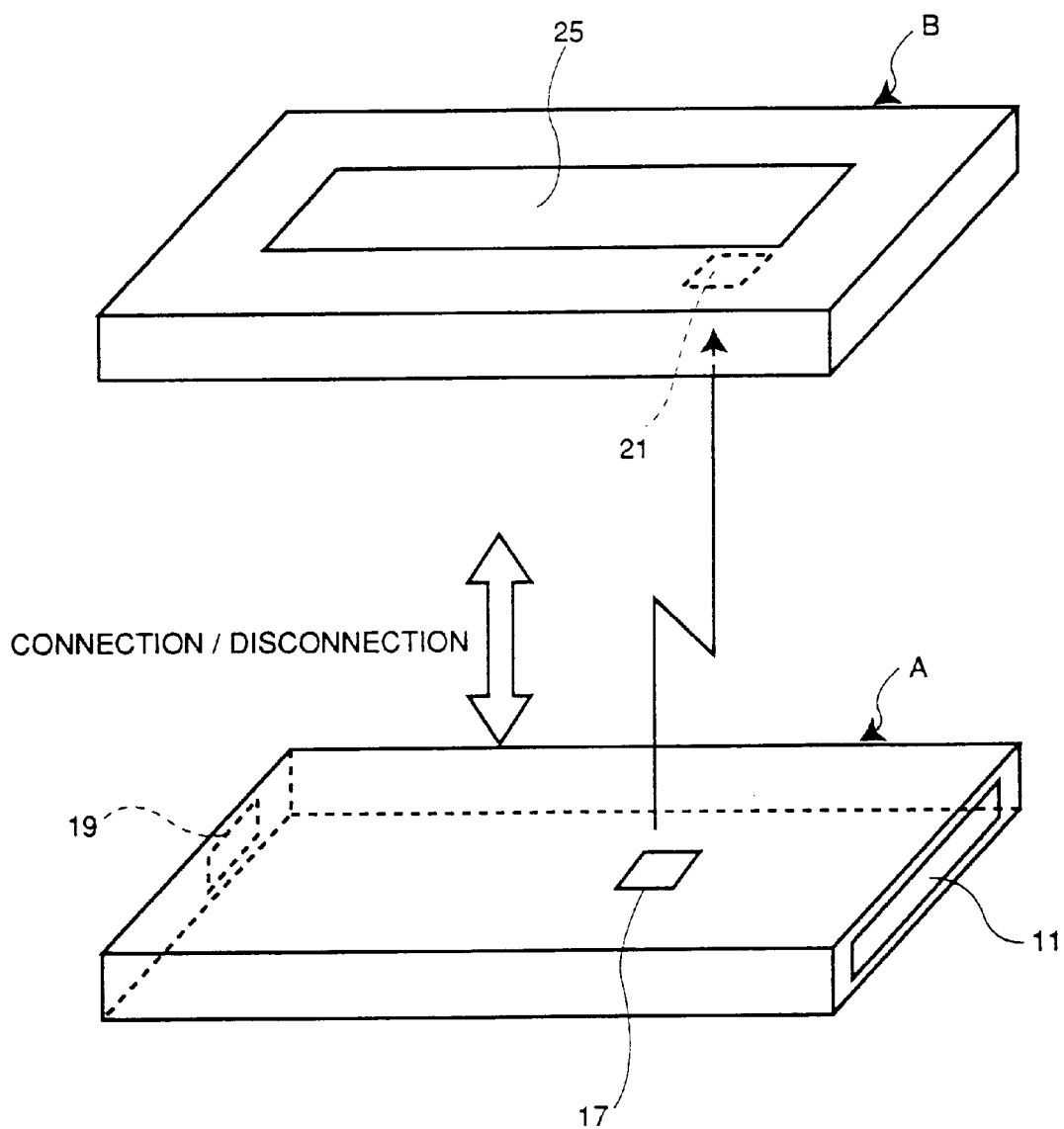
FIG. 2 is a perspective view showing a first embodiment of an external appearance.

FIG. 1 is a block diagram showing a first embodiment of the separative PC card structure of the present invention and FIG. 2 is a perspective view showing the first embodiment of the separative PC card external appearance.

The separative PC card is a PC card with a display unit and comprises a body block A that is inserted into a PC's socket for connection and a display block B that is connectable/disconnectable to/from the block A and receives data optically transmitted from the body block A and displays the data on the screen. The block A is explained below.

The numeral 11 is a connector. The connector 11 is inserted into the PC's socket and connects the PC and the body block A.

The numeral 12 is a PC connection control section. The PC connection control section 12 controls connection between the body block A and the PC.

The numeral 13 is a memory. The memory 13 stores data transmitted/received to/from the PC.

The numeral 14 is a CPU. The CPU 14 controls each section of the body block A.

The numeral 15 is a parallel/serial (P/S) data converter. The PS data converter 15 converts parallel data from the CPU 14 into serial data.

The numeral 16 is an optical transmission circuit. The optical transmission circuit 16 converts data output from the P/S data converter 15 into an optical modulation signal.

The numeral 17 is a light emitting diode (referred to as LED, hereinafter). The LED 17 optically transmits an optical modulation signal from the optical transmission circuit 16 to the display block B.

The numeral 18 is a switching detection section. The switching detection section 18 detects a switch operation by the switch 19 explained later.

The numeral 19 is a switch for various operations.

The numeral 20 is a power source. The power source 20 comprises a chargeable battery and the like for supplying direct current to each section of the body block A and the like.

The numeral 21 is a photo diode (referred to as PD, hereinafter). The PD 21 receives optical data from the body block A and outputs a reception signal that is generated by converting light into the electric signal.

The numeral 22 is an optical reception circuit. The optical reception circuit 22 demodulates data from the reception signal that was converted into the electric signal by PD 21.

The numeral 23 is a serial/parallel (referred to as S/P, hereinafter) data converter. The S/P data converter 23 converts serial data output from the optical reception circuit 22 into parallel data.

The numeral 24 is a clock generation circuit. The clock generation circuit 24 outputs a clock signal to a control signal generation circuit 27, explained later.

The numeral 25 is a liquid-crystal display (referred to as LCD, hereinafter). The LCD 25 displays parallel data output from the S/P data converter 23 on its screen.

The numeral 26 is a display control section corresponding to parallel data. The display control section 26 outputs an 8 bit parallel data from the S/P data converter 23 to the LCD 25 based on a device select signal and a data light signal.

The numeral 27 is a control signal generation circuit. The control signal generation circuit 27 generates a device select signal and a data light signal based on the clock signal generated by the clock generation circuit 24.

The numeral 28 is a power source. The power source 28 comprises a chargeable battery and the like for supplying direct current to each section of the display block B and the like.

Next the above-mentioned operations of the first embodiment are explained.

FIG. 3A to FIG. 3E are timing charts showing the first embodiment of processing signals and timing of the operations.

Figure 3:
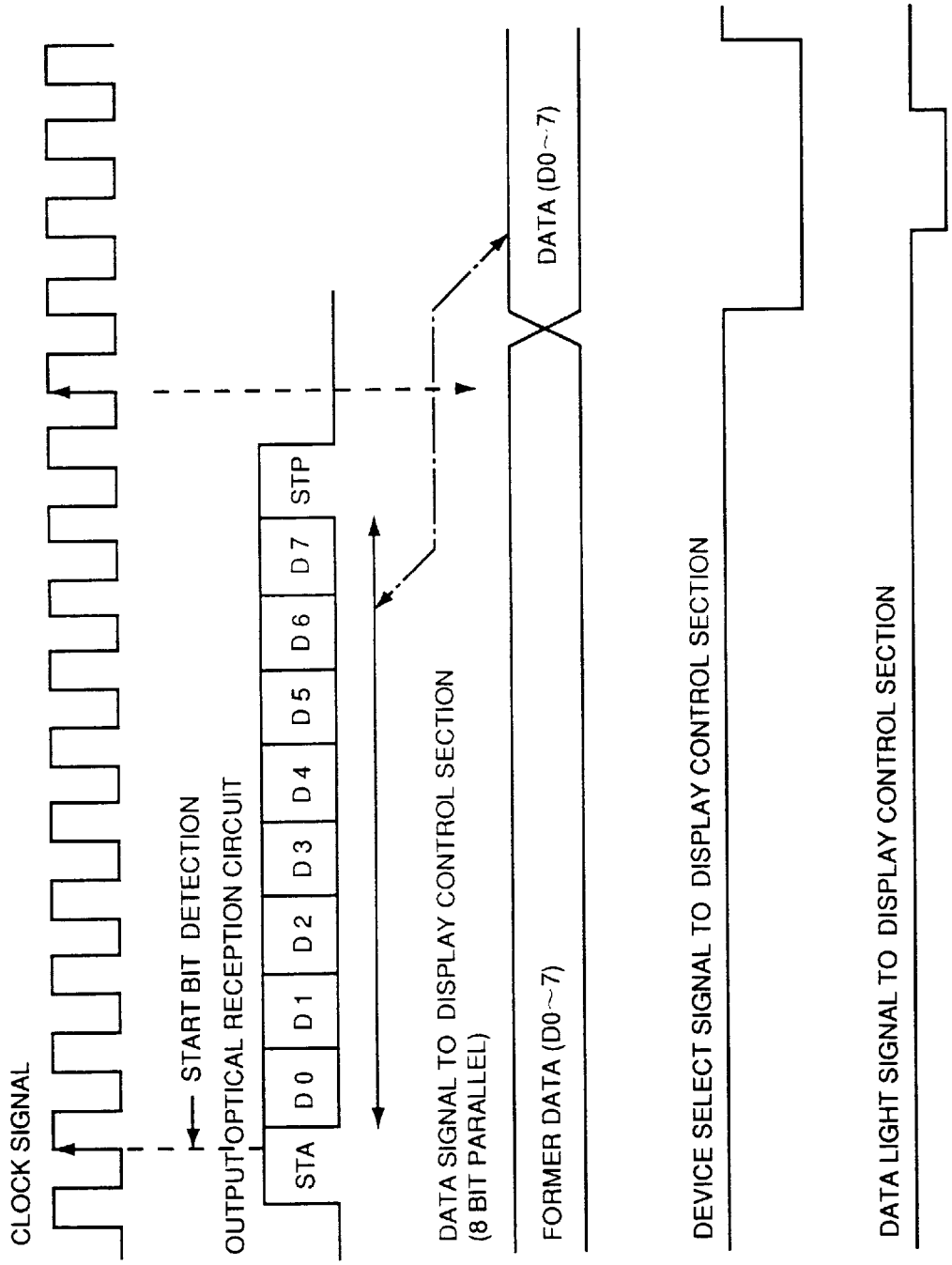
FIG. 3A to FIG. 3E are timing charts showing a first embodiment of processing signals and timing of operations.

FIG. 3A is a diagram showing a clock signal generated by the clock generation circuit 24. The data transmission rate of a clock signal is usually sixteen times faster than that between the body block A and the display block B. However the transmission rate is supposed as two times faster here for simplifying explanations.

In the body block A the CPU 14 detects a transmission instruction by the switch 19 by the switching detection section 18. The CPU 14 reads data stored in the memory 13 of the PC through the connector 11 and the PC connection control section 12 and transmits the data to the P/S data converter 15.

The P/S data converter 15 converts parallel data read from the memory into serial data. The serial data output from the P/S data converter 15 is positive theory start-stop synchronization signal and, as shown in FIG. 3B, comprises 1 bit of start bit, 8 bit of data bit, zero bit of parity, and 1 bit of stop bit. And the serial data from the P/S data converter 15 is modulated in the optical transmission circuit 16 then optically transmitted from the LED 17 to the display block B.

In the display block B optical transmission from the body block A is received in the PD 21 and converted into an electric signal. The reception signal converted into the electric signal is input to the optical reception circuit 22 and the 8 bit serial data shown in FIG. 3B is demodulated. This 8 bit serial data is then input to the S/P data converter 23 based on the start bit.

The S/P data converter 23 converts the 8 bit serial data into the 8 bit parallel data shown in FIG. 3C then outputs the data to the display unit control section 26 and the control signal generation circuit 27.

In the control signal generation circuit 27 the number of clock counts from the start bit is counted based on the clock signal from the clock generation circuit 24 and the device select signal shown in FIG. 3D and the data light signal shown in FIG. 3E are generated. These device select signal and data light signal are then output to the display unit control section 26.

The display unit control section 26 outputs the 8 bit parallel data from the S/P data converter 23 to the LCD 25 based on the device select signal and the data light signal. The LCD 25 then displays data.

Figure 4:
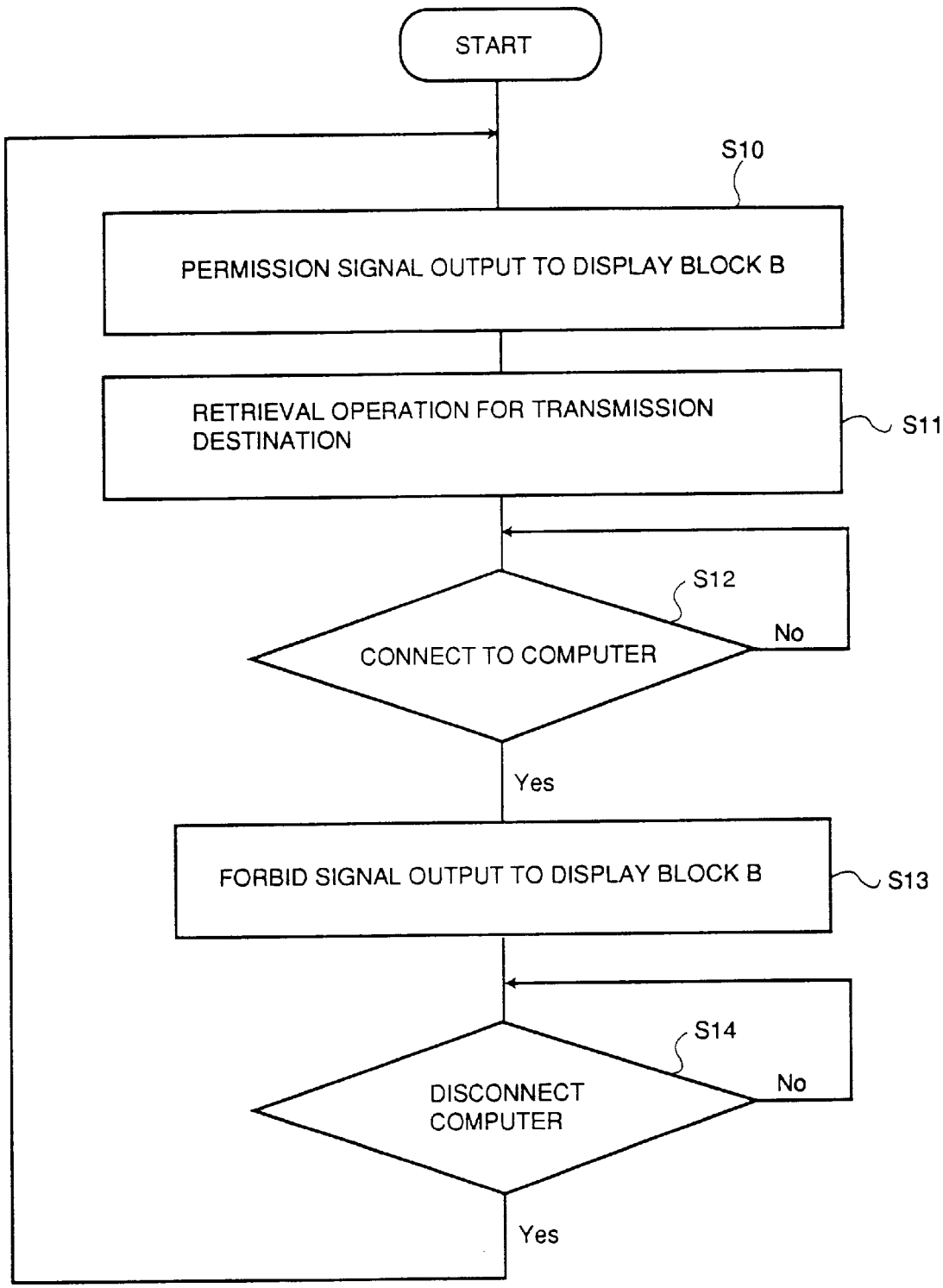
FIG. 4 is a flow chart showing a first embodiment of processing sequence of connection operation between a computer and a body block.

FIG. 4 is a flow chart showing processing sequence of the connection operation to the computer in the body block A and the display block B.

When a signal output permission signal is output from the switch 19 to display block B through the switching detection section 18 (step S10), the CPU 14 controls a retrieval operation for the transmission destination of the PC or the display block B (step S11).

Next the CPU 14 determines whether the connector 11 is connected to the PC (not shown in the figure) (step S12).

When the PC is connected (Yes), the CPU 14 specifies 'forbidden' for signal output to the display block B and stops output operation (step S13).

Next the CPU 14 determines whether the connector 11 is not connected to the PC (step S14). When the connector is disconnected from the PC (Yes), the process returns to the step S10 and signal output to the display block B is permitted.

That is, when the connector 11 is connected to the PC (not shown in the figure), data is transmitted to the PC and when the connector 11 is disconnected from the PC, data is transmitted to the display block B.

Figure 13:
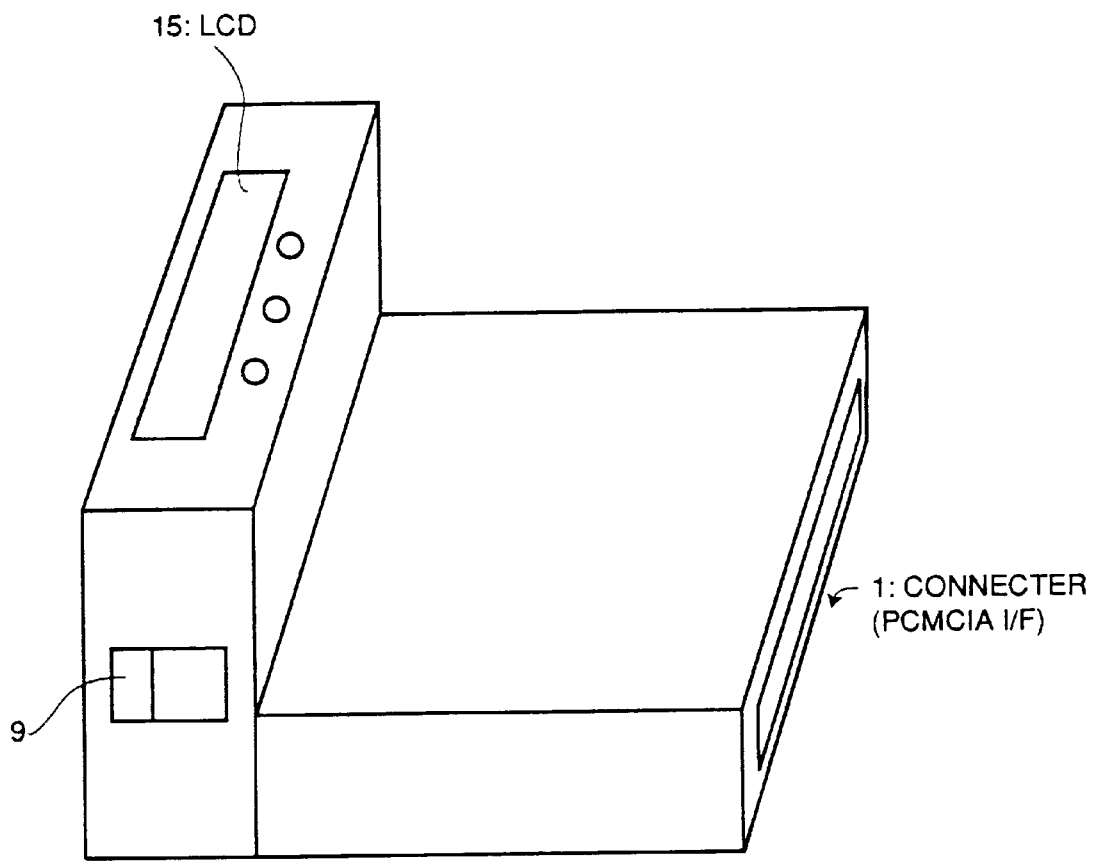
FIG. 13 is a perspective view showing an external appearance of a prior art of a PC card.

As explained above, one-way data transmission is performed in the first embodiment wherein the body block B receives data optically transmitted from the body block A and displays the data. At this time the body block A and the display block B are connectable/disconnectable therefore portability and operativity are improved. For example, even if the PCMCIA specifications is applied to the thickness, the body block A can be connected to the PC and used with the display block separated. Therefore the increase of the dimension is more reduced when compared with the case where a display unit and an operation section are connected in the conventional embodiment shown in FIG. 13 and the PC card can be easily shaped in a portable form.

The body block A also optically transmits data to the display block B and, for example, when the PC card is equipped in a radio selective calling unit, a radio portable phone and a portable information terminal and the like, a clock signal no longer mixes into a radio processing signal through a signal line from the display section and a data error is rarely generated. In other words, the clock signal from the clock generation circuit 24 is supplied only to the S/P data converter 23 and the control signal generation circuit 27 and the signal does not mix into, especially, the optical transmission circuit 16, the LED 17, the PD 21 and the optical reception circuit 22, therefore a data error is rarely generated.

Next, the second embodiment is explained.

Figure 5:
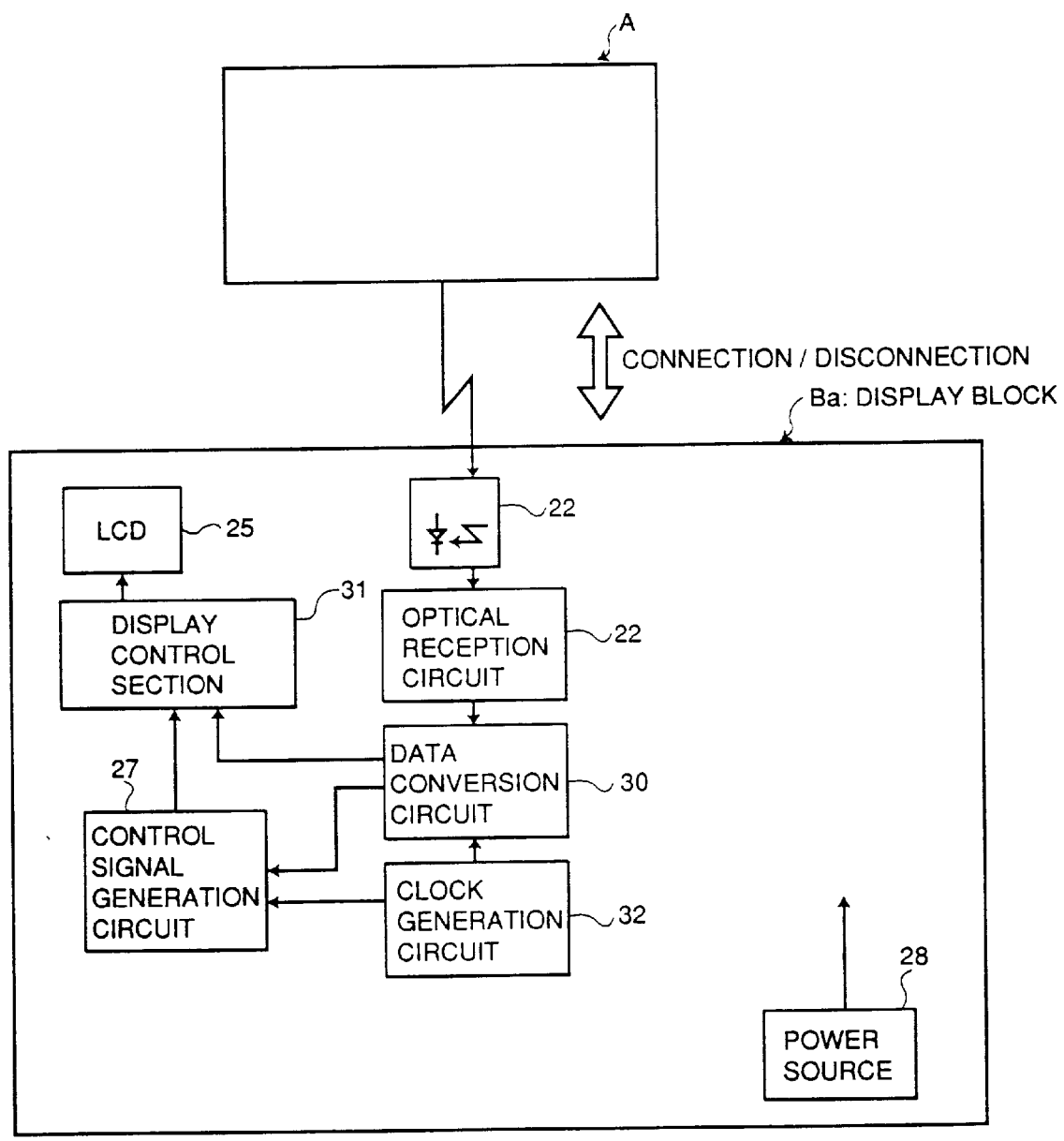
FIG. 5 is a block diagram showing a second embodiment of a display block structure.

FIG. 5 is a block diagram showing the second embodiment of the display block Ba structure.

Instead of the S/P data converter 23 shown in FIG. 1 and FIG. 2 of the first embodiment, the data conversion circuit 30 for converting serial data output from the optical reception circuit 22 into synchronous serial data is set in the second embodiment.

And instead of the display unit control section 26 corresponding to parallel data, the display unit control section 31 corresponding to serial data for controlling screen display on the LCD 25 is set.

Moreover, the clock generation circuit 32 for outputting a clock signal to the data conversion circuit 30 and the like is set.

Other elements are the same as those shown in FIG. 1 and FIG. 2 in the first embodiment.

Next operations of the second embodiment are explained.

FIG. 6A to FIG. 6E are timing charts showing processing signals and timing of operations in the second embodiment.

In FIG. 5 and FIG. 6, the data transmission rate of a clock signal generated in the clock generation circuit 32 is usually sixteen times faster than that between the body block A and the display block B. However the transmission rate is supposed as two times faster here for simplifying explanations.

In the display block Ba, data optically transmitted from the body block A is demodulated through the PD 21 and the optical reception circuit 22 and the demodulated 8 bit serial data based on the start bit shown in FIG. 6B is input to the data conversion circuit 30.

In the data conversion circuit 30, the 8 bit serial data shown in FIG. 6B is converted into the serial data shown in FIG. 6C and output to the display unit control section 31 and the control signal generation circuit 27.

The control signal generation circuit 27 generates a device select signal and a data light signal shown in FIG. 6D and a synchronous clock signal shown in FIG. 6E then output to the display unit control section 31, based on the clock signal from the clock generation circuit 32 and the number of clock counts from the start bit.

The display unit control section 31 outputs the 8 bit parallel data from the data conversion circuit 30 to the LCD 25 based on the device select signal and the data light signal. The LCD 25 displays the data.

The processing sequence of the connection operation to the computer in the body block A and the display block B of the second embodiment is the same as the flow chart shown in FIG. 4 explained in the first embodiment. The advantages of the second embodiment are also the same as those of the first embodiment. That is, optical one-way data transmission is performed and consequently portability and operativity are improved and a clock signal no longer mixes into a radio processing signal when a radio section is mounted.

Next the third embodiment is explained.

In the third embodiment, a switching instruction can also be issued from the display block Bb and optical bilateral transmission is performed for displaying data on the screen.

Figure 7:
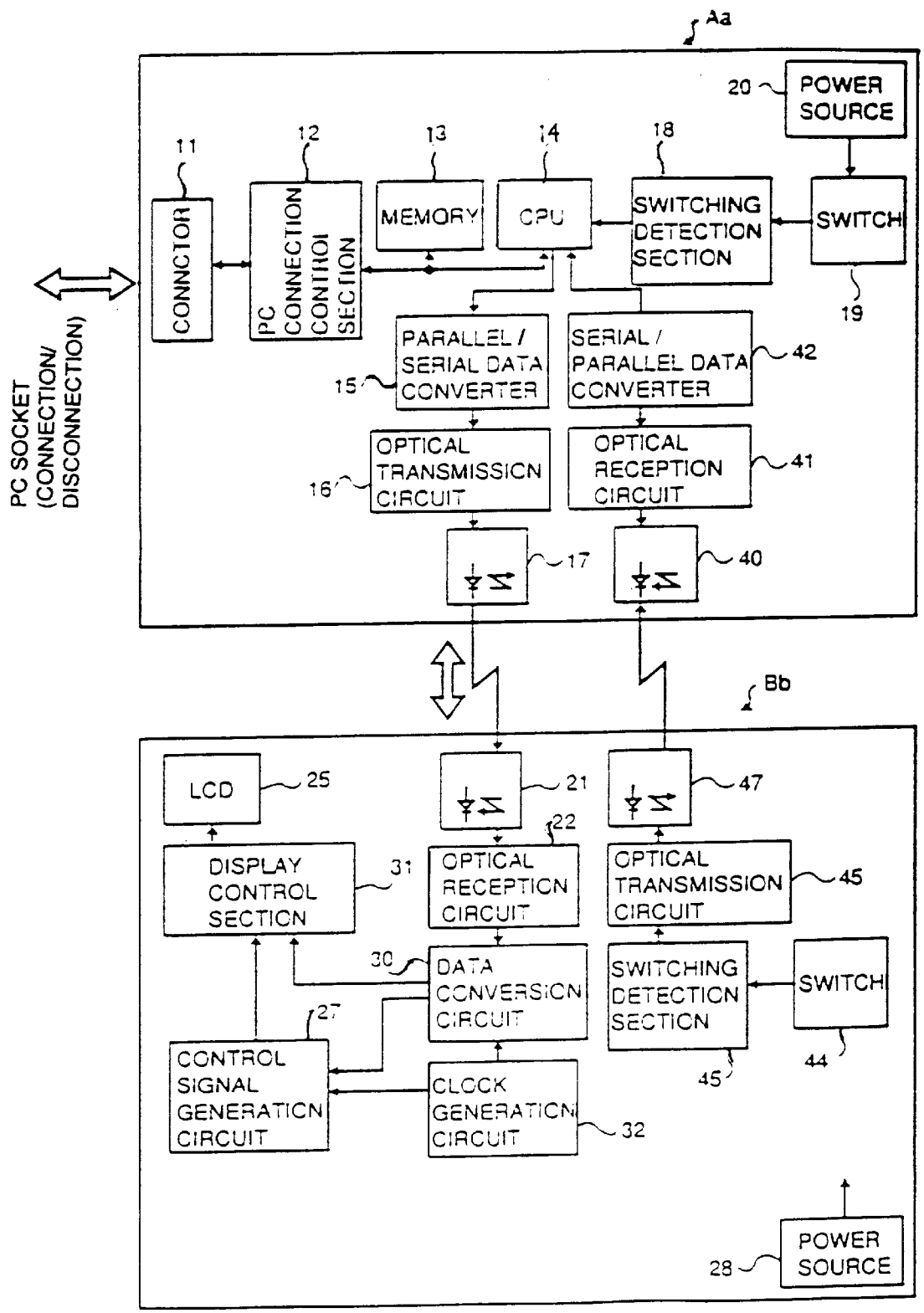
FIG. 7 is a block diagram showing a third embodiment of a body block structure and display block structure.
Figure 8:
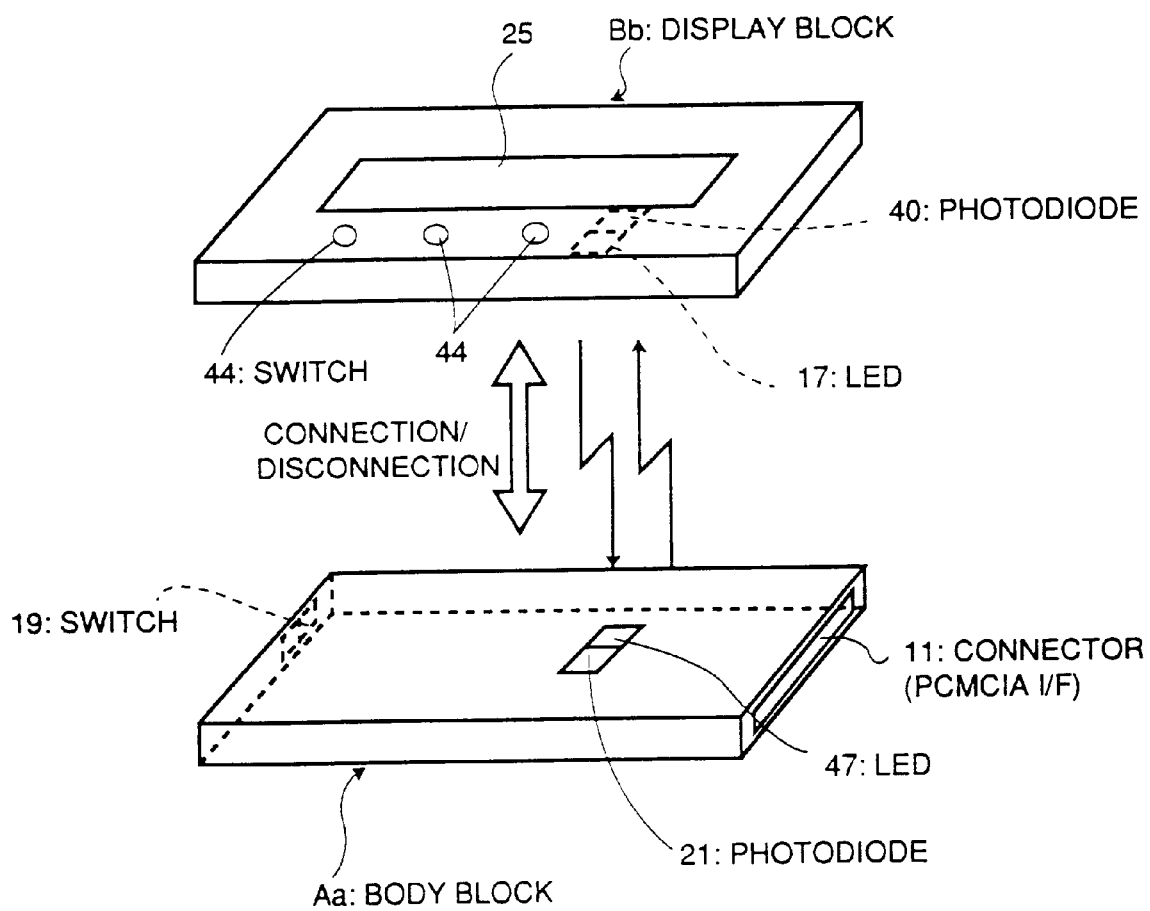
FIG. 8 is a perspective view showing a third embodiment of an external appearance.

FIG. 7 is a block diagram showing the third embodiment of the body block Aa structure and the display block Bb structure. FIG. 8 is a perspective view showing the external appearance of the block shown in FIG. 7.

In FIG. 7 and FIG. 8, like the first embodiment in FIG. 1, the body block Aa of the third embodiment comprises a connector 11, a PC connection control section 12, a memory 13, a CPU 14, a P/S data converter 15, an optical transmission circuit 16, an LED 17, a switching detection section 18, a switch 19 and a power source 20. Moreover, the body block Aa comprises such elements for bilateral optical transmission as a PD 40 which receives an optical signal for the switching instruction from the display block Bb, an optical reception circuit 41 which demodulates a reception signal from the PD 40 and outputs the demodulated data, and an S/P data converter 42 that converts serial data from the optical reception circuit 41 into parallel data and outputs the data to the CPU 14.

The display block Bb structure is the same as that of the second embodiment shown in FIG. 5, and comprises a PD 21, an optical reception circuit 22, a data conversion circuit 30, a clock generation circuit 32, an LCD 25, a display unit control section 31 corresponding to serial data, a control signal generation circuit 27 and a power source 28.

Moreover, the display block Bb comprises a switch 44 for switching instruction and a switching detection section 45 for detecting switching by the switch 44 for bilateral optical transmission with the body block Aa. The display block also comprises an optical transmission circuit 46 that modulates data to a switching signal from the switching detection section 45 and an LED 47 which is driven by the switching signal from the optical transmission circuit 46 and optically transmits the data.

Next, the operations of the third embodiment are explained.

In the third embodiment, the body block Aa operates in the same way as the first embodiment shown in FIG. 1. The display block Bb operates in the same way as the second embodiment shown in FIG. 5. In the display block Bb, the switching detection section 45 detects switching instruction by the switch 44 and modulates the instruction to a switching signal in the optical transmission circuit 46. This switching signal from the optical transmission circuit 46 is optically transmitted from the LED 47. In the body block Aa, the PD 40 receives an optical signal for switching instruction from the display block Bb and converts the optical signal into an electric signal. This reception signal from the PD 40 is then demodulated in the optical reception circuit 41 and the demodulated data is input to the S/P data converter 42. The S/P data converter 42 converts serial data into parallel data and outputs the data to the CPU 14. The CPU 14 can then issue the same instruction as a switching instruction by the switch 19 in the body block Aa in switching operation by the switch 44 in the display block Bb. The advantages of the third embodiment are the same as those of the first embodiment. That is, optical bilateral data transmission is performed and the body block Aa and the display block Bb are connectable/disconnectable. Consequently portability and operativity are improved and a clock signal no longer mixes into a radio processing signal when a radio section is mounted.

Next, the fourth embodiment is explained.

In the fourth embodiment, optical bilateral data transmission is performed using a data processing block D instead of the display block B to Bb in the first to the third embodiments.

Figure 9:
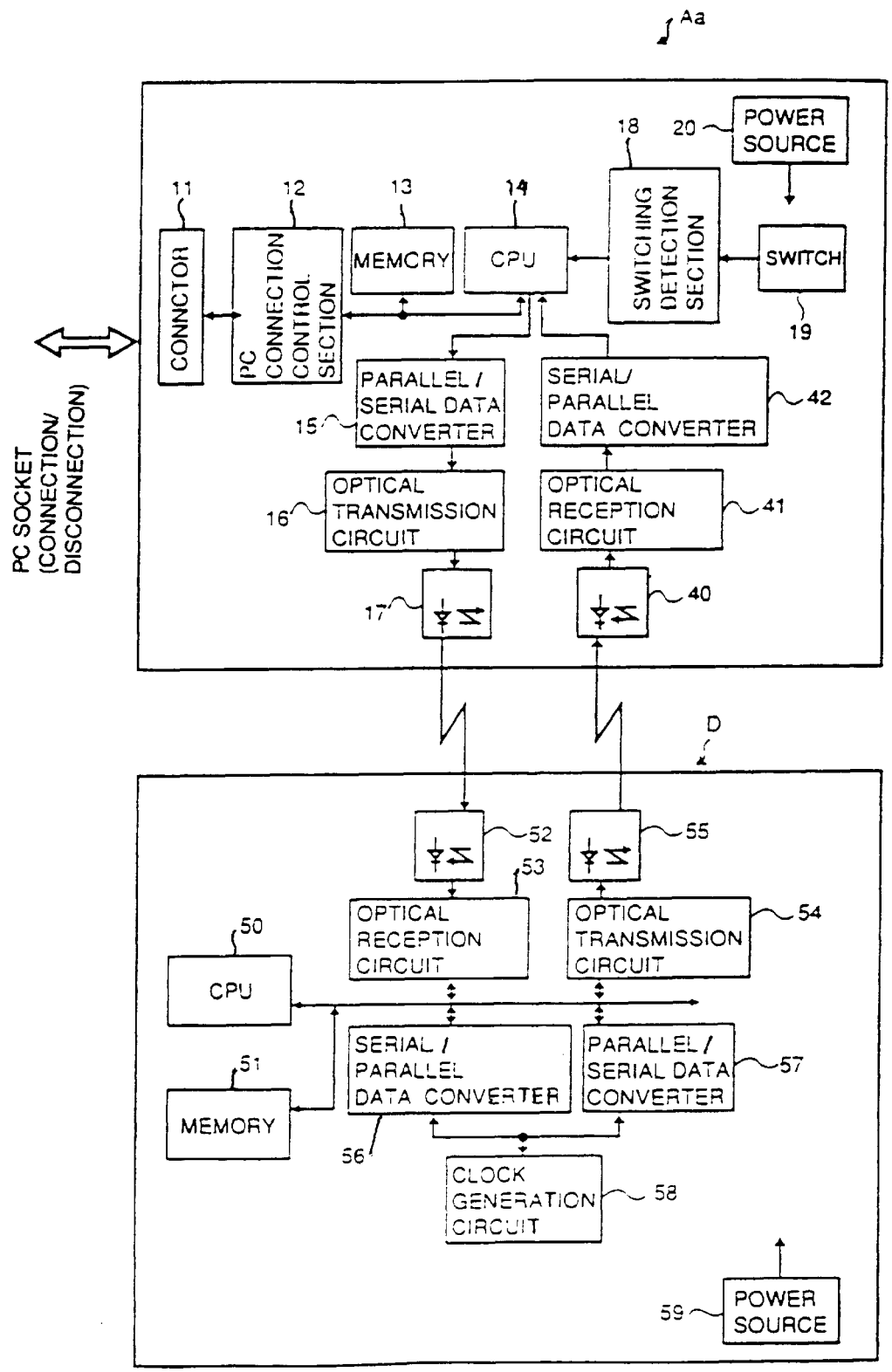
FIG. 9 is a block diagram showing a fourth embodiment of a structure.

FIG. 9 is a block diagram showing the fourth embodiment structure.

In FIG. 9, the body block Aa is the same as the third embodiment shown in FIG. 7. The data processing block D performing optical data transmission with the body block Aa comprises a CPU 5 for controlling each section and transmitting data to the body block Aa, a memory 51 and a PD 52 for receiving an optical signal from the body block Aa. The block also comprises an optical reception circuit 53 that is connected to the CPU 50 through a bus line and demodulates a reception signal from the PD 52 and an LED 55 that optically transmits data to the body block Aa. Moreover, the block D comprises an optical transmission circuit 54 that is connected to the CPU 50 through a bus line and transmits modulation data to the LED 55, and an S/P data converter 56 that is connected to the CPU 50 through a bus line and converts serial data into parallel data. Furthermore, the block comprises a P/S data converter 57 that is connected to the CPU 50 through a bus line and converts parallel data into serial data, a clock generation circuit 58 that supplies a clock signal to the S/P data converter 56 and the P/S data converter 57 and the like, and a power source 59 that supplies direct current to each section of the data processing block D.

Next, operations of the fourth embodiment are explained.

The body block Aa of the fourth embodiment shown in FIG. 9 operates in the same way as the first embodiment shown in FIG. 1. In the data processing block D, data is optically transmitted to the body block Aa under the control of the CPU 50. The PD 52 receives an optical signal from the body block Aa and converts the optical signal into an electric signal. This reception signal is then demodulated in the optical reception circuit 53. The S/P data converter 56 then converts the demodulated serial data into parallel data.

And the CPU 50 reads the parallel data from the memory 51.

The parallel data is then converted into serial data by the P/S data converter 57 and transmitted to the optical transmission circuit 54. The optical transmission circuit 54 modulates the serial data and outputs the data to the LED 55. The LED 55 then optically transmits the data to the body block Aa.

In the fourth embodiment, optical bilateral data transmission is performed and the body block Aa and the display block Bb are connectable/disconnectable. Consequently portability and operativity are improved and a clock signal no longer mixes into a radio processing signal when a radio unit is mounted.

Next, the fifth embodiment is explained.

Like the fourth embodiment, bilateral data transmission is performed in the fifth embodiment and the data is input from an external computer.

Figure 10:
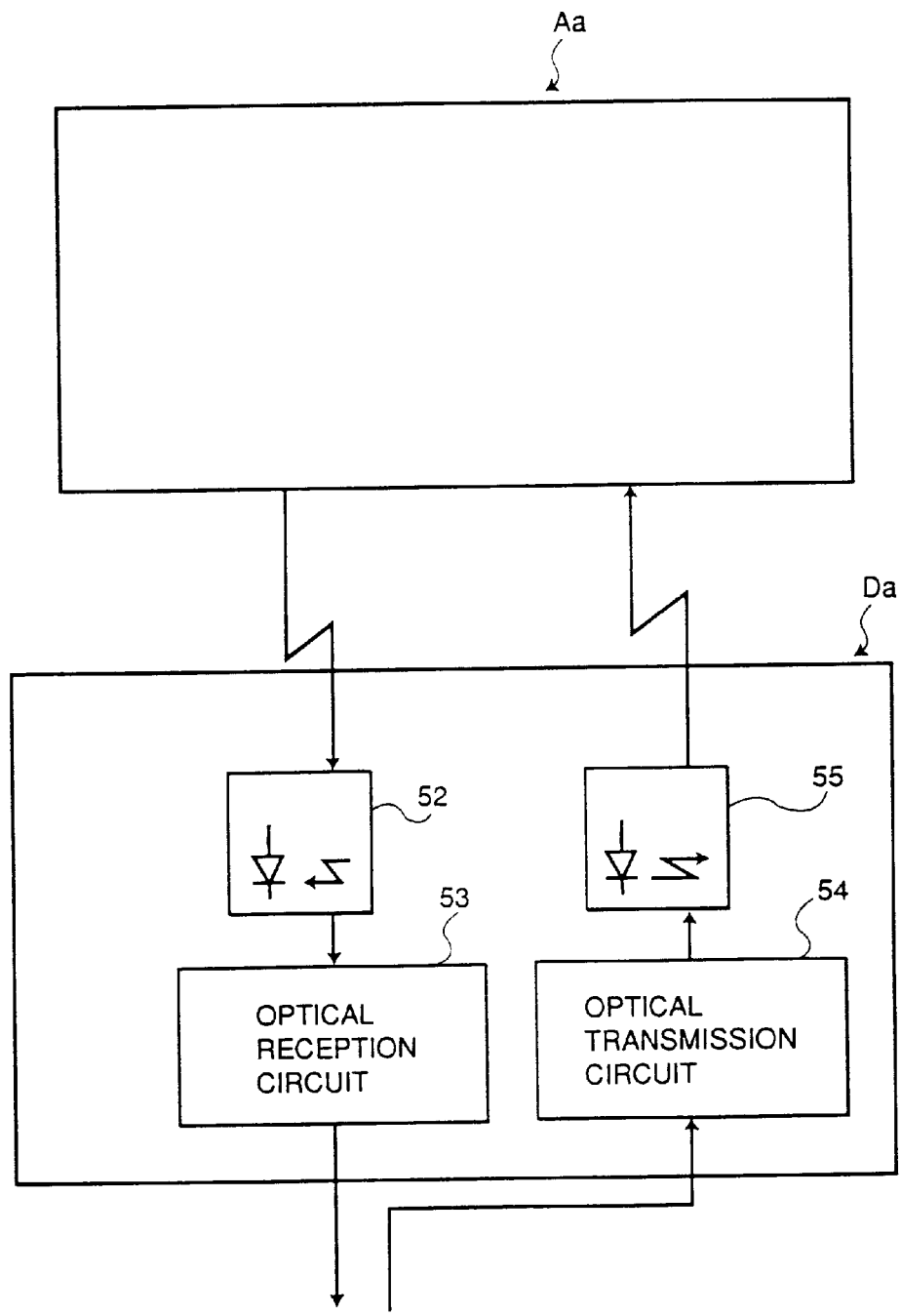
FIG. 10 is a block diagram showing a fifth embodiment of a structure.

FIG. 10 is a block diagram showing the main construction of the fifth embodiment.

In FIG. 10, the body block Aa is the same as the third embodiment shown in FIG. 7. The data processing block Da optically transmitting data to the body block Aa comprises a PD 52 for receiving an optical signal from the body block Aa and converts the optical signal into an electric signal, an optical reception circuit 53 for demodulating the reception signal from the PD 52, an optical transmission circuit 54 for transmitting the demodulation data, and an LED 55 for optically transmitting the demodulation data from the optical transmission circuit 54 to the body block Aa. The optical reception circuit 53 and the optical transmission circuit 54 are connected to a serial interface (I/F) of the computer (not shown in the figure), for example, RS232CI/F circuit.

The data processing block Da in the fifth embodiment operates in the same way as the forth embodiment shown in FIG. 9 and optically transmits the data sent from the computer through the I/F circuit through the optical transmission circuit 54 and the LED 55. The PD 52 receives an optical signal from the body block Aa and converts the optical signal into an electric signal. The reception signal is then demodulated in the optical reception circuit 53 and transmitted to the computer through the I/F circuit.

Like the fourth embodiment, optical bilateral data transmission is performed in the fifth embodiment and the advantages are the same as those of the fourth embodiment. Also, data is transmitted by the connected computer therefore the data can be transmitted in large capacity.

As described above, in the first to the third embodiments, the body block A or Aa performs one-way/bilateral optical data transmission and the display block B, Ba, or Bb displays the data on the screen.

In the fourth and fifth embodiments, the block Aa performs bilateral optical data transmission with the data processing block D or Da.

In these cases, the body blocks A, Aa and the display blocks B, Ba, Bb and the data processing blocks D, Da are connectable/disconnectable and data can be optically processed (transmitted/received) among these blocks. Therefore, the body, display and data processing blocks are connected/disconnected for exchange. At this time, the body block A or Aa determines the optical transmission/reception destination from the display block B, Ba or Bb and the data processing block D or Da then displays the result or transmits the data.

Figure 11:
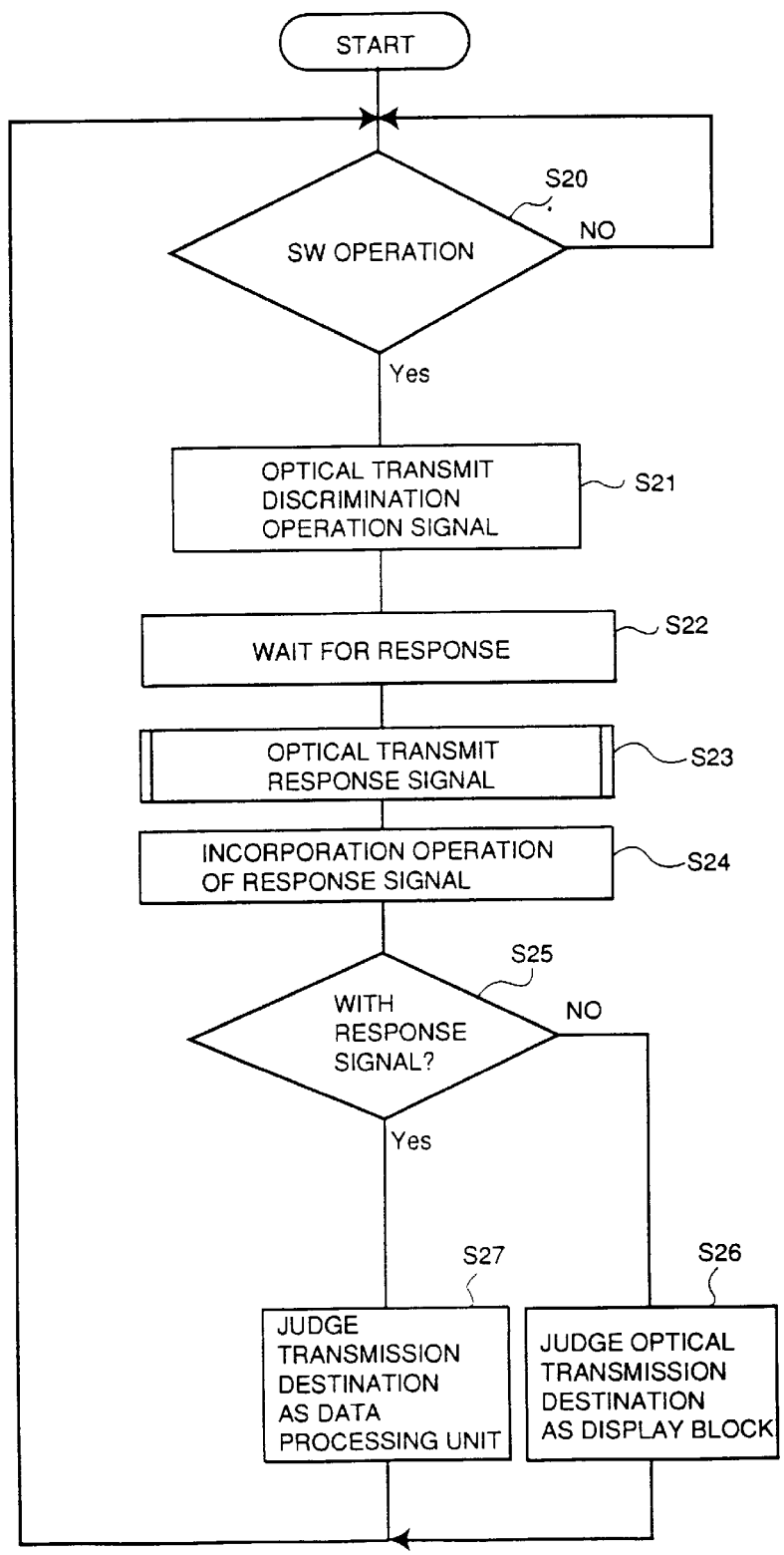
FIG. 11 is a flow chart showing processing sequence of display or data transmission determination operation of a body block.
Figure 12:
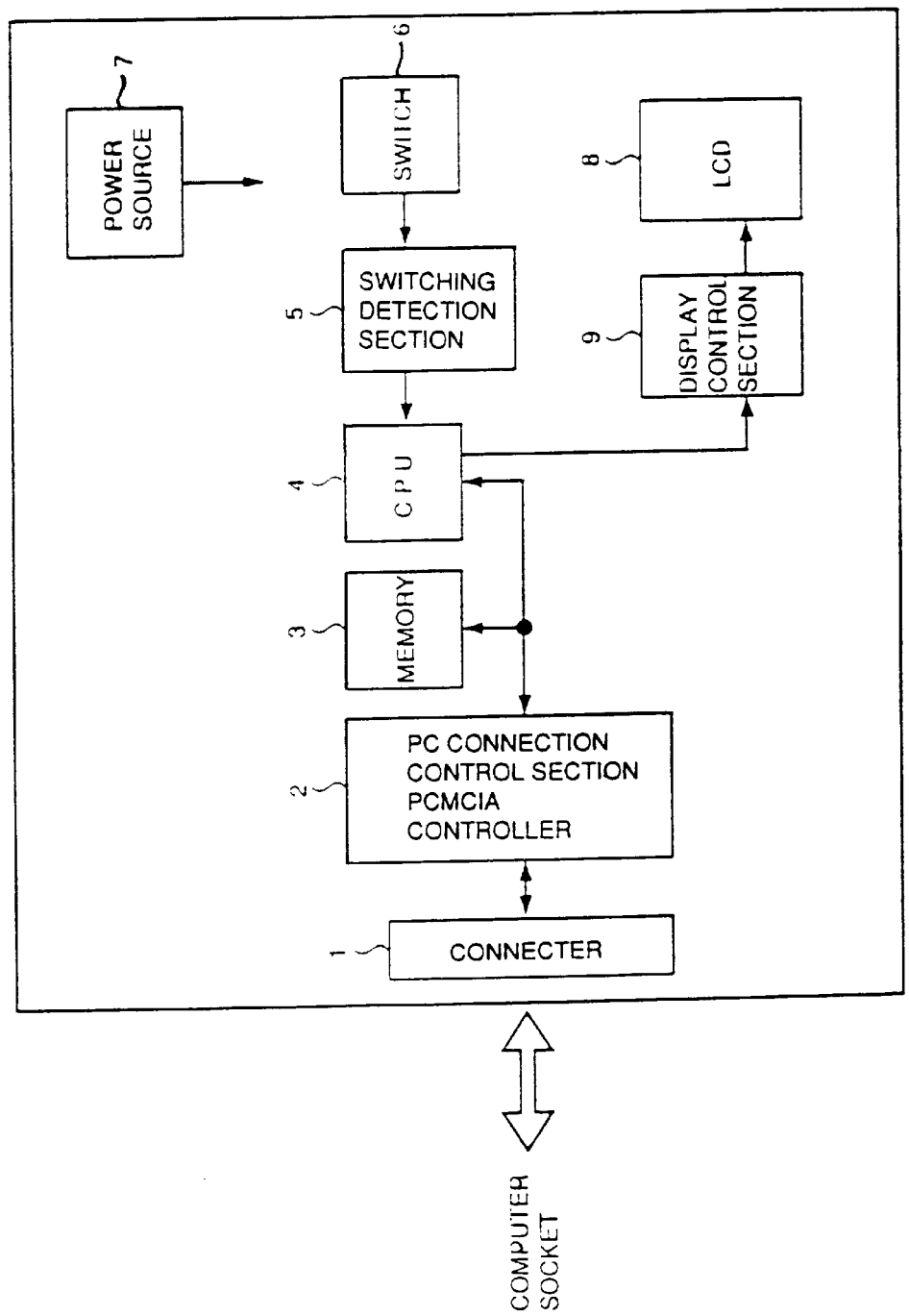
FIG. 12 is a block diagram showing a prior art of a PC card structure.

FIG. 11 is a flow chart showing processing sequence of the determination operation for display or data transmission in the body block A and Aa.

In the embodiment of FIG. 11, the processing is continued from the switch 19 of the body block A and Aa in FIG. 1 and FIG. 7. First, a determination operation signal is input to the CPU 14 through the switching detection section 18 and the optical transmission destination is determined from the data processing block D or Da (step S20). When the signal is input (Yes), the signal is transmitted to the data processing block D or Da through the P/S data converter 15, the optical transmission circuit 16, and the LED 17 (step 21).

Then, the processing enters response wait state from the data processing block D or Da (step S22). The data processing block D or Da receives the optical signal determination operation signal from the body block A or Aa and optically transmits the response signal that is a response to the received signal (step S23).

When the response signal is not input to the CPU 14 in a certain period of time counted by a built-in timer and the like (step S25: No), the display block B, Ba or Bb in the first to the third embodiments is determined as the optical transmission destination (step S26), that is, it is detected that the optical transmission destination is the display block B, Ba or Bb that displays data on the screen.

Furthermore, when the response signal is input in a certain period of time counted by a built-in timer and the like (step S25: Yes), the data processing block D or Da in the fourth and fifth embodiments is determined as the optical transmission destination (step S27). At this time, in the data processing block D or Da in the step S23, an optical signal determination operation signal command of the body block A or Aa is processed in the PD 52, the optical reception circuit 53, and the S/P data converter 56 and input to the CPU 50, then the response signal is transmitted to the body block A or Aa through the P/S data converter 57, the optical transmission circuit 54 and the LED 55.

In the body block A or Aa, the optical transmission response signal from the data processing block D or Da is input to the CPU 14 through the PD 40, the optical reception circuit 41, and the S/P data converter 42 to check them.

In this way, it is automatically determined whether the destination optically communicating with the body block A and Aa is any one of the display block B, Ba and Bb for data screen display or the destination is either the data processing block D or Da. As a result, the PC can automatically perform secure and easy data transmission with the data processing block D or Da that is freely connected/disconnected by a user.

In this embodiment, radio transmission is performed by light and data transmission/reception may be performed, for example, by using an infrared ray that generates no leakage electric wave such as a clock signal.

What is claimed is:

1. A personal computer (PC) card to be connected with a computer comprising a body block and a display block, wherein said display block comprises:
reception means for receiving data transmitted from a second transmission means of said body block;
first data conversion means for converting data received by said reception means into a into a specified format data;
display means for displaying data converted by said first data conversion means;
instruction generation means for generating an instruction for said body block; and
first transmission means for transmitting said instruction to said body block not through wire; and
said body block comprises:
a connector for connecting with said computer;
connection control means for controlling a connection between said connector and said computer;
second data conversion means for receiving data from said computer via said connector and for converting said data into a specified format data;
said second transmission means for transmitting data converted by said second data conversion means to said display block not through wire;

reception means for receiving said instruction from said display block not through wire; and control means for controlling data transmission based on said received instruction.

2. The PC card of claim 1, wherein said body block and said display block are physically integrated.

3. The PC card of claim 1, wherein said transmission means of said display block comprises transmission means for transmitting data by using light; and said reception means of said body block comprises reception means for receiving data by using light.

4. The PC card of claim 1, wherein said transmission means of said display block comprises transmission means for transmitting data by using an infrared ray; and said reception means of said body block comprises reception means for receiving data by using an infrared ray.

5. A personal computer (PC) card to be connected with a computer comprising a body block, a display block and a data processing block, wherein said display block comprises:
  first reception means for receiving data transmitted from a second transmission means in said body block;
  first data conversion means for converting data received by said first reception means into a specified format data;
  display means for displaying data converted by said first data conversion means;
  instruction generation means for generating an instruction for said body block;
  first transmission means for transmitting said instruction to said body block not through wire; and said body block comprises:
  a connector for connecting with said computer;
  connection control means for controlling connection between said connector and said computer;
  second data conversion means for receiving data from said computer via said connector and for converting said data into a specified format data;
  said second transmission means for transmitting data converted by said second data conversion means to said display block and/or said data processing block not through wire;
  second reception means for receiving data from said data processing block;
  third data conversion means for converting data received by said second reception means into a specified format data;
  third reception means for receiving said instruction transmitted by said first transmission means in said display block; and
  control means for controlling data transmission based on said received instruction; and said data processing block comprises:
  fourth reception means for receiving data transmitted by said second transmission means in said body block;
  fourth data conversion means for converting data received by said fourth reception means into a specified format data;
  fifth data conversion means for converting data to be transmitted to said body block into a specified format data; and
  third transmission means for transmitting data converted by said fifth data conversion means to said body block not through wire.

6. The PC card of claim 5, wherein said body block and said data processing block are integrated.

7. The PC card of claim 5, wherein said first transmission means, said second transmission means, and said third transmission means respectively comprise transmission means for transmitting data by using light; and said first reception means, said second reception means, said third transmission means, and said fourth reception means respectively comprise reception means for receiving data by using an infrared ray.

8. The PC card of claim 5, wherein said first transmission means, said second transmission means, and said third transmission means respectively comprises transmission means for transmitting data by using an infrared ray; and said first reception means, said second reception means, said third reception means, and said fourth reception means respectively comprise reception means for receiving data by using an infrared ray.

9. A personal computer (PC) card to be connected with a computer comprising a body block, a display block and a data processing block, wherein said body block comprises:
  a connector for connecting with said computer;
  connection control means for controlling connection between said connector and said computer;
  first data conversion means for receiving data from said computer via said connector and converting said data into a specified format data;
  first transmission means for transmitting data converted by said first data conversion means to said display block and/or said data processing block not through wire;
  first reception means for receiving data from said data processing block;
  second data conversion means for converting data received by said first reception means into a specified format data; and said display block comprises:
  second reception means for receiving data transmitted from said first transmission means;
  third data conversion means for converting data received by said second reception means into a specified format data;
  display means for displaying data converted by said third data conversion means;
  second transmission means for transmitting a determination signal to said data processing block via said first transmission means;
  estimation means for estimating that a communication destination is said display block when no response signal to said determination signal is received via said second reception means during a certain period of time; and said data processing block comprises:
  third reception means for receiving data transmitted by said first transmission means in said body block;
  fourth data conversion means for converting data received by said third reception means into a specified format data;
  fifth data conversion means for converting data to be transmitted to said body block into a specified format data; and third transmission means for transmitting data converted by said fifth data conversion means to said body block not through wire; and fourth transmission means for transmitting a response signal to said received determination signal from said second transmission means to said body block when a transmission destination of said body block is said data processing block.

10. The PC card of claim 9, wherein said body block, said display block and said data processing block are integrated.

* * * * *